(12) United States Patent
Dunham et al.

(10) Patent No.: US 10,671,426 B2
(45) Date of Patent: Jun. 2, 2020

(54) DATA PROCESSING

(71) Applicant: ARM Limited, Cambridge (GB)

(72) Inventors: Curtis Glenn Dunham, Austin, TX (US); Jonathan Curtis Beard, Austin, TX (US); Roxana Rusitoru, Cambridge (GB)

(73) Assignee: ARM Limited, Cambridge (GB)

( * ) Notice: Subject to any disclaimer, the term of this patent is extended or adjusted under 35 U.S.C. 154(b) by 450 days.

(21) Appl. No.: 15/361,770

(22) Filed: Nov. 28, 2016

(65) Prior Publication Data

US 2018/0150315 A1    May 31, 2018

(51) Int. Cl.
*G06F 9/46* (2006.01)
*G06F 9/50* (2006.01)
*G06F 9/48* (2006.01)
*G06F 12/0831* (2016.01)
(Continued)

(52) U.S. Cl.
CPC ............ *G06F 9/461* (2013.01); *G06F 9/46* (2013.01); *G06F 9/462* (2013.01); *G06F 9/4812* (2013.01); *G06F 9/4843* (2013.01); *G06F 9/50* (2013.01); *G06F 9/5005* (2013.01); *G06F 9/5016* (2013.01); *G06F 9/5022* (2013.01);
(Continued)

(58) Field of Classification Search
CPC . G06F 9/46; G06F 9/461; G06F 9/462; G06F 9/50; G06F 9/5005; G06F 9/5016; G06F 9/5022; G06F 9/52; G06F 13/1663
See application file for complete search history.

(56) References Cited

U.S. PATENT DOCUMENTS

| 6,973,650 B1 | 12/2005 | Parkes |
| 7,373,646 B1 | 5/2008 | Smith |
| 7,484,208 B1 | 1/2009 | Nelson |

(Continued)

FOREIGN PATENT DOCUMENTS

| EP | 1 570 352 | 9/2005 |
| WO | WO 2008/061154 | 5/2008 |

OTHER PUBLICATIONS

International Search Report and Written Opinion of the International Searching Authority dated Feb. 9, 2018 in PCT/GB2017/053370, 17 pages.
(Continued)

*Primary Examiner* — Charles M Swift
(74) *Attorney, Agent, or Firm* — Nixon & Vanderhye, P.C.

(57) ABSTRACT

Data processing apparatus comprises one or more interconnected processing elements; each processing element being configured to execute processing instructions of program tasks; each processing element being configured to save context data relating to a program task following execution of that program task by that processing element; and to load context data, previously saved by that processing element or another of the processing elements, at resumption of execution of a program task; each processing element having respective associated format definition data to define one or more sets of data items for inclusion in the context data; the apparatus comprising format selection circuitry to communicate the format definition data of each of the processing elements with others of the processing elements and to determine, in response to the format definition data for each of the processing elements, a common set of data items for inclusion in the context data.

15 Claims, 5 Drawing Sheets

(51) Int. Cl.
*G06F 13/16* (2006.01)
*G06F 9/52* (2006.01)

(52) U.S. Cl.
CPC ............ *G06F 9/52* (2013.01); *G06F 12/0831* (2013.01); *G06F 13/1663* (2013.01)

(56) References Cited

U.S. PATENT DOCUMENTS

| | | | |
|---|---|---|---|
| 7,493,621 B2 * | 2/2009 | Bradford | G06F 9/463 711/123 |
| 2005/0010728 A1 | 1/2005 | Piry | |
| 2006/0168347 A1 * | 7/2006 | Martin | G06F 9/546 709/246 |
| 2006/0259749 A1 | 11/2006 | Veale | |
| 2008/0140971 A1 | 6/2008 | Dankel | |
| 2008/0201561 A1 | 8/2008 | Bates | |
| 2008/0263323 A1 | 10/2008 | Mould | |
| 2008/0270653 A1 | 10/2008 | Balle | |
| 2009/0172411 A1 | 7/2009 | Kershaw | |
| 2009/0234987 A1 | 9/2009 | Lee | |
| 2010/0023666 A1 | 1/2010 | Mansell | |
| 2010/0161948 A1 * | 6/2010 | Abdallah | G06F 9/30043 712/228 |
| 2011/0083130 A1 | 4/2011 | Boldyrev et al. | |
| 2011/0265084 A1 | 10/2011 | Knowles et al. | |
| 2011/0271126 A1 | 11/2011 | Hill | |
| 2011/0307681 A1 | 12/2011 | Piry | |
| 2012/0233410 A1 * | 9/2012 | Fu | G06F 12/0831 711/141 |
| 2012/0260239 A1 | 10/2012 | Martinez Canedo | |
| 2013/0179666 A1 | 7/2013 | Yamashita | |
| 2014/0032886 A1 | 1/2014 | Santis | |
| 2014/0082624 A1 | 3/2014 | Iwabuchi | |
| 2014/0157287 A1 | 6/2014 | Howes et al. | |
| 2014/0258693 A1 | 9/2014 | Lindholm et al. | |
| 2014/0298338 A1 | 10/2014 | Doi | |
| 2014/0304708 A1 | 10/2014 | Martz et al. | |
| 2014/0351519 A1 | 11/2014 | Munoz | |
| 2014/0359636 A1 * | 12/2014 | Xu | G06F 9/4856 718/108 |
| 2014/0365662 A1 * | 12/2014 | Dave | G06F 9/45533 709/226 |
| 2015/0006861 A1 * | 1/2015 | Toll | G06F 9/3867 712/225 |
| 2015/0052329 A1 | 2/2015 | Fujinami | |
| 2015/0254104 A1 | 9/2015 | Kessler | |
| 2015/0277920 A1 * | 10/2015 | Bradbury | G06F 9/3851 712/215 |
| 2016/0098303 A1 * | 4/2016 | Balakrishnan | G06F 9/5016 718/102 |
| 2016/0239346 A1 | 8/2016 | Kipp | |
| 2017/0034272 A1 | 2/2017 | Kazi | |

OTHER PUBLICATIONS

International Search Report and Written Opinion of the International Searching Authority dated Feb. 13, 2018 in PCT/GB2017/053374, 14 pages.

International Search Report and Written Opinion of the International Searching Authority dated Feb. 19, 2018 in PCT/GB2017/053371, 16 pages.

U.S. Appl. No. 15/361,819, filed Nov. 28, 2016, Inventor: Dunham et al.

U.S. Appl. No. 15/361,871, filed Nov. 28, 2016, Inventor: Dunham et al.

K.K. Rangan et al, "Thread Motion: Fine-Grained Power Management for Multi-Core Systems" *ISCA '09*, Jun. 20-24, 2009, 12 pages.

Office Action dated Oct. 19, 2018 in co-pending U.S. Appl. No. 15/361,871, 26 pages.

Office Action dated Apr. 5, 2019 in U.S. Appl. No. 15/361,819, 32 pages.

* cited by examiner

DATA PROCESSING

BACKGROUND

This disclosure relates to data processing.

In arrangements of one or more interconnected processing elements, a program task such as a thread can be executed by processing elements in successive portions, possibly interspersed with portions of execution of other program tasks. Execution can be passed from one processing element to another. To enable this, a process referred to as context switching may take place.

In a context switch, each processing element is configured to save context data relating to a program task following execution of that program task by that processing element; and to load context data, previously saved by that processing element or another of the processing elements, at resumption of execution of a program task.

SUMMARY

In an example arrangement there is provided data processing apparatus comprising:

one or more interconnected processing elements;

each processing element being configured to execute processing instructions of program tasks;

each processing element being configured to save context data relating to a program task following execution of that program task by that processing element; and to load context data, previously saved by that processing element or another of the processing elements, at resumption of execution of a program task;

each processing element having respective associated format definition data to define one or more sets of data items for inclusion in the context data;

the apparatus comprising format selection circuitry to communicate the format definition data of each of the processing elements with others of the processing elements and to determine, in response to the format definition data for each of the processing elements, a common set of data items for inclusion in the context data.

In another example arrangement there is provided data processing apparatus comprising:

one or more interconnected processing elements each configured to execute processing instructions of a program task; and coherent memory circuitry storing one or more copies of data accessible by each of the processing elements, so that data written to a memory address in the coherent memory circuitry by one processing element is consistent with data read from that memory address in the coherent memory circuitry by another of the processing elements;

in which:

the coherent memory circuitry is arranged as one or more memory regions each storing data defining a respective program task;

each processing element is configured to take exclusive write access to a memory region of the coherent memory circuitry corresponding to a given program task while that processing element is executing that program task and to release exclusive write access to that memory region following execution of the given task by that processing element.

In another example arrangement there is provided a method comprising:

each processing element, in a group of one or more interconnected processing elements configured to execute processing instructions of program tasks, saving context data relating to a program task following execution of that program task by that processing element, each processing element having respective associated format definition data to define one or more sets of data items for inclusion in the context data;

each processing element loading context data, previously saved by that processing element or another of the processing elements, at resumption of execution of a program task; and communicating the format definition data of each of the processing elements with others of the processing elements and to determine, in response to the format definition data for each of the processing elements, a common set of data items for inclusion in the context data.

In another example arrangement there is provided a method comprising:

coherently storing one or more copies of data accessible by each of one or more interconnected processing elements, so that data written to a memory address by one processing element is consistent with data read from that memory address by another of the processing elements;

defining one or more memory regions of the coherently stored data, each memory region storing data defining a respective program task;

each processing element taking exclusive write access to a memory region of the one or more memory regions corresponding to a given program task while that processing element is executing that program task; and that processing element releasing exclusive write access to that memory region following execution of the given task by that processing element.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
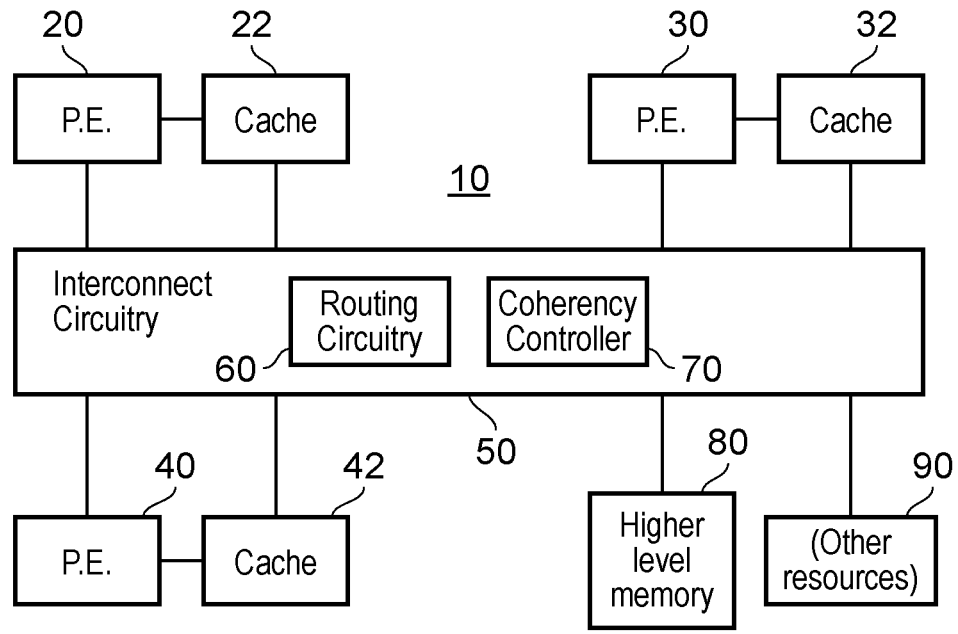
FIG. 1 schematically illustrates a data processing apparatus.

Before discussing the embodiments with reference to the accompanying figures, the following description of embodiments is provided.

An example embodiment provides data processing apparatus comprising:

one or more (for example, two or more) interconnected processing elements;

each processing element being configured to execute processing instructions of program tasks;

each processing element being configured to save context data relating to a program task following execution of that program task by that processing element; and to load context data, previously saved by that processing element or another of the processing elements, at resumption of execution of a program task;

each processing element having respective associated format definition data to define one or more sets of data items for inclusion in the context data;

the apparatus comprising format selection circuitry to communicate the format definition data of each of the processing elements with others of the processing elements and to determine, in response to the format definition data for each of the processing elements, a common set of data items for inclusion in the context data.

The example embodiment allows an interaction to take place in which one or more processing elements can agree (or can be provided with) a common set of data items for inclusion in context data, based on format definition data defining each processing element's capabilities or context data for context switching. This common set is then used in context switch operations between the processing elements.

This arrangement can allow different processing elements having different capabilities in respect of their context data to interact and take part in program task switching using a common set of context data items.

In examples, the set of data items for each processing element is indicative of a set of processing capabilities of that processing element. Example capabilities include one or more processing capabilities selected from the list consisting of:

a capability to access one or more processor registers;

a capability to operate according to one or more control states; and a capability to provide the function of a specialized computational unit.

In examples, the format selection circuitry is configured to select, as a common set of data items, data items indicated by the format definition data as being common to all of the processing elements. However, this could but need not be all items which are common to the processing elements, In examples, the format selection circuitry is configured to select, as a common set of data items, all of the data items indicated by the format definition data as being common to all of the processing elements. But in other examples, the format selection circuitry is configured to select, as a common set of data items, a subset of those data items indicated by the format definition data as being common to all of the processing elements. The selection of a subset may be made in response to data defining one or more criteria selected from the list consisting of:

a criterion defining a maximum latency at program task suspension or resumption; and a criterion defining a set of items required by program tasks to be executed.

Further context data may be provided or loaded as required. For example, one or more of the processing elements may be configured to detect, after loading context data and resuming execution of a program task, whether that processing element requires further data items generated by another of the processing elements which previously executed that program task and, when such further data items are required, to load those further data items.

Example arrangements provide coherent memory circuitry storing one or more copies of data accessible by each of the processing elements, so that data written to a memory address in the coherent memory circuitry by one processing element is consistent with data read from that memory address in the coherent memory circuitry by another of the processing elements.

This can provide a convenient way of storing, exchanging and loading context data at a context switch, without necessarily requiring the intervention of an operating system, in which each processing element is configured to take exclusive write access to a memory region corresponding to a program task while that processing element is executing that program task. Each processing element can then be configured, in response to suspension of a program task by that processing element, to release exclusive write access of that memory region, and each processing element can be configured, at resumption of execution of a program task, to take exclusive write access to a memory region of the coherent memory circuitry in which context data relating to that program task, previously saved by that processing element or another of the processing elements, is stored and to load the stored context data from that memory region.

In examples, the coherent memory circuitry comprises two or more coherent cache memories and the coherent memory circuitry is configured to store multiple copies of the data accessible by each of the processing elements.

The selection of the common format or set of context data items can be made in response to various occurrences. For example, the format selection circuitry may be configured to communicate the format definition data and to determine the common set of data items for inclusion in the context data in response to a condition selected from the list consisting of:

power-on of the apparatus;

reset of the apparatus;

addition of a device to the apparatus; and removal of a device from the apparatus.

Another example embodiment provides data processing apparatus comprising:

one or more interconnected processing elements each configured to execute processing instructions of a program task; and coherent memory circuitry storing one or more copies of data accessible by each of the processing elements, so that data written to a memory address in the coherent memory circuitry by one processing element is consistent with data read from that memory address in the coherent memory circuitry by another of the processing elements;

in which:

the coherent memory circuitry is arranged as one or more memory regions each storing data defining a respective program task;

each processing element is configured to take exclusive write access to a memory region of the coherent memory circuitry corresponding to a given program task while that processing element is executing that program task and to release exclusive write access to that memory region following execution of the given task by that processing element.

As discussed above, in examples the memory region corresponding to a program task is configured to store context data relating to that program task. Each processing element may be configured, in response to suspension of a program task by that processing element, to save context data relating to that program task to the respective memory region of the coherent memory circuitry. Each processing element may be configured, at resumption of execution of a program task, to take exclusive write access to the corresponding memory region of the coherent memory circuitry in which context data relating to that program task, previously saved by that processing element or another of the processing elements, is stored, and to load the stored context data from that memory region.

Another example embodiment provides a method comprising:

each processing element, in a group of one or more interconnected processing elements configured to execute processing instructions of program tasks, saving context data relating to a program task following execution of that program task by that processing element, each processing element having respective associated format definition data to define one or more sets of data items for inclusion in the context data;

each processing element loading context data, previously saved by that processing element or another of the processing elements, at resumption of execution of a program task; and communicating the format definition data of each of the processing elements with others of the processing elements and to determine, in response to the format definition data for each of the processing elements, a common set of data items for inclusion in the context data.

Another example embodiment provides a method comprising:

coherently storing one or more copies of data accessible by each of one or more interconnected processing elements, so that data written to a memory address by one processing element is consistent with data read from that memory address by another of the processing elements;

defining one or more memory regions of the coherently stored data, each memory region storing data defining a respective program task;

each processing element taking exclusive write access to a memory region of the one or more memory regions corresponding to a given program task while that processing element is executing that program task; and that processing element releasing exclusive write access to that memory region following execution of the given task by that processing element.

Referring now to the drawings, FIG. 1 schematically illustrates a data processing apparatus comprising: a plurality of processing elements (as examples of data handling nodes 20, 30, 40) and interconnect circuitry 50 connected to the plurality of data handling nodes. The interconnect circuitry comprises data routing circuitry 60 for controlling and monitoring data handling transactions as between the various data handling nodes and a coherency controller 70, to be discussed below.

The data handling nodes 10 . . . 20 can include various types of node, such as, for example, a processing element such as a CPU (central processing unit, as an example of a data processing element) or CPU cluster, possibly with an associated cache memory; a memory; peripheral components such as input/output components, direct memory access (DMA) devices and so on. In the present example they are processing elements. However, the present embodiments envisage arrangements with only one processing element and cache memory, and arrangements with more than one processing element. Indeed, a feature of the present arrangements is that in use, processing elements and/or cache memory devices may be added to the interconnected arrangement (for example by being newly connected or newly enabled for operation (such as powered up)), or may be removed from the interconnected arrangement (for example by being physically removed from the interconnected arrangement or by being logically removed, for example by being powered down). In an arrangement with a single processing element, the handshaking process discussed above could take place with itself (and in doing so, it would be detected that no other processing elements are present at that time). However in other example's, two or more interconnected processing elements are used.

Each processing element in this example is associated with a cache memory 22, 32, 42. The cache memories store locally and quickly accessible copies of data, for example data held in a higher level memory 80 such as a main memory or a higher level cache memory.

Other processing or data handling resources 90 may also be connected to the interconnect circuitry 50.

The data processing apparatus of FIG. 1 may be implemented as a single integrated circuit, for example as a so-called system on a chip (SoC) or a so-called network on a chip (NoC). Alternatively, the data processing apparatus of FIG. 1 may be implemented as multiple discrete and interconnected systems.

The data processing apparatus of FIG. 1 is just one example of how a set of processing elements may be interconnected. In other examples, processing elements are interconnected by a bus, network, memory, RDMA (remote direct memory access, allowing a processing element of one computer to access the memory of another processing element of another computer without the involvement of either device's operating system), or equivalent device. Therefore, the interconnect circuitry 50 is simply an example indicative of various types of networking, interconnecting, bus or other circuitry to interconnect processing elements to allow the exchange of data and the switching of task execution in the manner described here.

In example embodiments, the interconnect circuitry may be an example of so-called cache coherent interconnect circuitry. Here, the term "coherent" refers to the maintenance of a correct relationship between multiple copies of the same data stored across the whole system. For example, data may be stored in a cache memory device 22 by one of the data handling nodes (such as the node 20). Other nodes (such as the nodes 30, 40) may be processing elements having their own respective caches 32, 42 which, depending on the nature of the processing element operations, may store one or more copies of data which is also held in the cache memory 22. In the case of a data handling access by one node to such information, there is a need to ensure that the accessing node is accessing the latest version of the stored information, and that if it makes any alteration to the stored information, either the other versions are correctly altered themselves or the other versions are deleted or invalidated. In general terms, the caches 22, 32, 42 and the coherency controller 70 provide coherent memory circuitry storing one or more copies of data accessible by each of the processing elements (for example, each of the processing elements connected via the interconnect circuitry 50), so that data written to a memory address in the coherent memory circuitry by one processing element is consistent with data read from that memory address in the coherent memory circuitry by another of the processing elements.

In examples, the coherent memory circuitry comprises two or more coherent cache memories (22, 32, 42) and the coherent memory circuitry is configured to store one or more (for example, multiple) copies of the data accessible by each of the processing elements.

In the example situation discussed above of devices being added to or subtracted from the interconnected arrangement, the coherency controller 70 can be arranged to react to the addition of a device by adding it to the so-called coherency domain, and bringing it into coherent operation with other devices in the interconnected arrangement, and to react to the subtraction of a device by reconfiguring the coherent domain to operate in the absence of that device. This reconfiguring may involve first ensuring (before the device is removed) that any data updates at that device are appropriately propagated to other coherent devices and/or the higher level memory.

The data routing circuitry 60 and/or the coherency controller 70 include various mechanisms and circuitry to provide for coherent operation. Examples of these will be discussed below.

An example processing element in the arrangement of FIG. 1 may make reference to data stored in an associated cache memory, with both the processing element and the cache memory being in communication with the interconnect circuitry. The cache memory may store copies of information held in the higher level memory 80. In some instances, the two copies can be the same, for example if a copy has been cached during a memory read operation. In other instances, circumstances could arise which would lead to copies differing from one another, for example if a data write operation has been carried out by a particular processing element (such as the processing element 20) with respect to the copy of a data item stored in the cache 22. In a system of multiple caches, there is a need to ensure that before one version of a data item is accessed, any changes which have been implemented in respect of other versions are fully implemented for all copies.

The role of logic associated with the cache coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then cache coherence logic avoids conflicts with other existing copies of the data item. Techniques for achieving this include (for example) the use of a so-called "snoop filter".

The term "snoop filter" is a historical one and is used here to refer to a control device forming part of the coherency controller 70 having an associated "directory", where the directory stores information indicating which data is stored in which cache, and the snoop filter itself at least contributes to the handling of data accesses to cached information so as to provide a cache coherence function.

For example, a snoop filter, having a directory as discussed above and a register indicating those cache memories which are currently part of the coherency control arrangement (otherwise referred to as being in the coherent system or in the coherent domain) forms part of the coherency controller 70 associated with the routing circuitry 60. The routing circuitry 60 is in data communication with the one or more cache memories.

The snoop filter handles at least a part of a process under which, when any of the data handling nodes 20 . . . 40 intends to access or modify data which is stored as a cache line in any of the cache memories, that node obtains permission to do so. As part of this process, the snoop filter checks whether any other cache memories have a copy of the line which is to be modified. If any other copies are in existence at other cache memories, then those copies need to be cleared and invalidated. If those copies themselves contain modifications to the stored data in that line, then in at least some circumstances, the coherency controller 60 (or the snoop filter itself) instructs the cache memory to write that line back to main memory.

In the case of a read access by a node with respect to data stored in a cache memory, it is important that the node 20 . . . 40 requesting the read has access to the latest correct version of the cached data. The coherency controller 70 oversees this process so that if another cache has a recently-modified version of the required data, that other cache writes back the modified version and/or forwards a copy of the modified version for caching at the currently requesting node.

The coherency controller 70 including the snoop filter therefore provides an example of a cache coherency controller configured to coordinate, amongst the cache memories, an access to a memory address by one of the cache memories when the directory indicates that another of the cache memories is caching that memory address. The snoop controller stores or provides a directory such as the directory mentioned above indicating, for memory addresses cached by one or more of a group of one or more cache memories connectable in a coherent cache structure, which of the cache memories are caching those memory addresses.

Figure 2:
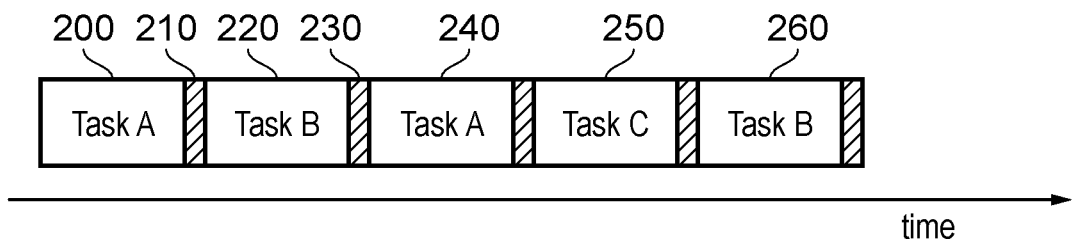
FIG. 2 schematically illustrates task switching by a processing element.

FIG. 2 schematically illustrates task switching by a processing element such as one of the processing elements 20 . . . 40 of FIG. 1.

In general terms, program functions are carried out by executing program code and referred to here as "tasks". An example of a task is a processing thread. Execution of a task may take place for a particular period and then the processing element can switch to execution of a different task before, potentially, returning to the first task for another period and so on.

In between these periods, a so-called context switch takes place. The context switch involves saving a current state of the processing element at the end of execution of a particular task and restoring a previously saved stated of the processing element in preparation for a period of execution of another task. Overall, this can give the impression that the processing element is handling multiple programs or "threads" at once, whereas in fact it is executing small portions of each task intermittently.

In the example of FIG. 2, the processing element executes, for a period 200, a first task (task A). There is then a short period 210 during which the context switch referred to above takes place. Here, the processing element saves context data relating to the program task A following execution of that program task by the processing element, and loads context data, previously saved by that processing element or another processing element, at resumption of execution of a next task (task B) in a period 220.

So, it can be seen that a particular processing element may execute a particular task for a period, but then having saved the context data relating to that task, execution of that task may next be taken up in a subsequent period by that processing element another of the interconnected processing elements.

At the end of execution of task B in the period 220, a context switch occurs in a period 230 followed by execution of task A again in a period 240, with subsequent tasks in this example being task C in a period 250 and task B in a period 260.

The arrangement of FIG. 2 relates to one of the processing elements. In the system of FIG. 1, there are three example processing elements and each may be switching between tasks in the manner shown. A particular task may be executed by successive (though not necessarily contiguous) periods of execution on any of the processing elements, with the saved context data being used to facilitate the switching of the task from one processing element to another.

Figure 3:
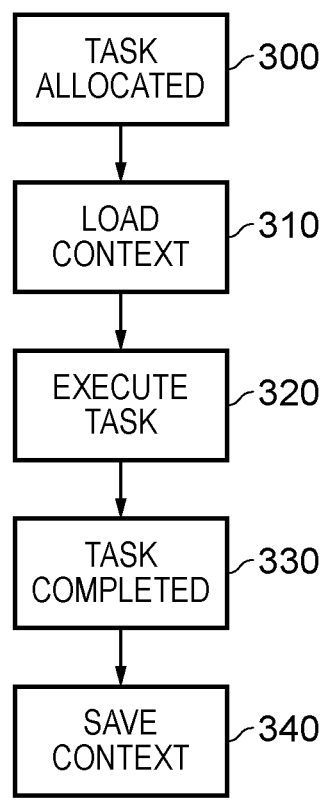
FIG. 3 is a schematic flowchart illustrating task execution.

FIG. 3 is a schematic flowchart illustrating some basic aspects of task execution in the manner described with reference to FIG. 2.

At step 300, a task is allocated to a particular processing element. The allocation of tasks is carried out by scheduling circuitry in one example, and this will be discussed further below.

At a step 310, the processing element loads previously-saved context data relating to that task (saved by the previous processing element to execute that task, whether or not that is the same processing element as the one about to execute the task) and at a step 320 executes the task for a period of time.

Note that the steps 310, 320 may overlap in time. A certain amount of context data may be required in order to start the execution of a task, but other items of context data may be loaded after execution has started or may even be deferred until they are required (a so-called "lazy" loading of context data). In other examples, additional context data can be pushed or provided by a previous processing element which executed that task, for example by writing it to a dedicated memory area with an identifier of the source processing element. This arrangement can provide for potentially faster context switching because it can reduce the amount of context data which has to be loaded before task execution can even start, so allowing execution to start sooner than would be possible if every possible item of context data were first loaded before commencing execution.

The execution of the task can continue until, for example, a processor interrupt is received which may be due to an external interrupt situation or may be in response to a timer indicating that the period of time allocated to that particular instance of execution of that task has come to an end. At a step 330, that instance of execution of that task is completed and, following execution of that program task, context data is saved at a step 340. The process of FIG. 3 may then be restarted by that processing element in respect of a next task to be executed.

Figure 4:
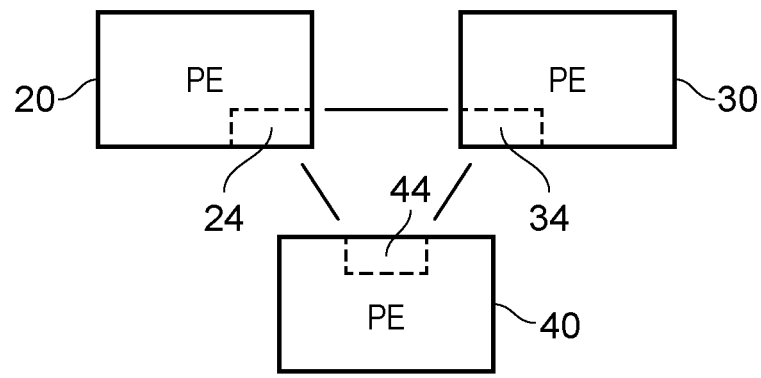
FIGS. 4 to 6 schematically illustrate implementations of scheduling and format selection circuitry.
Figure 5:
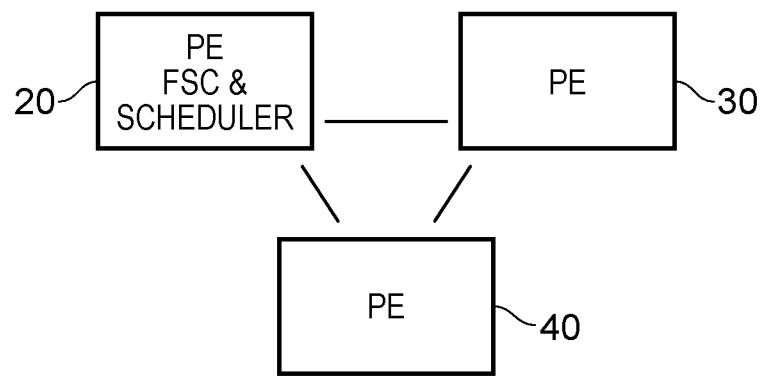
Figure 6:
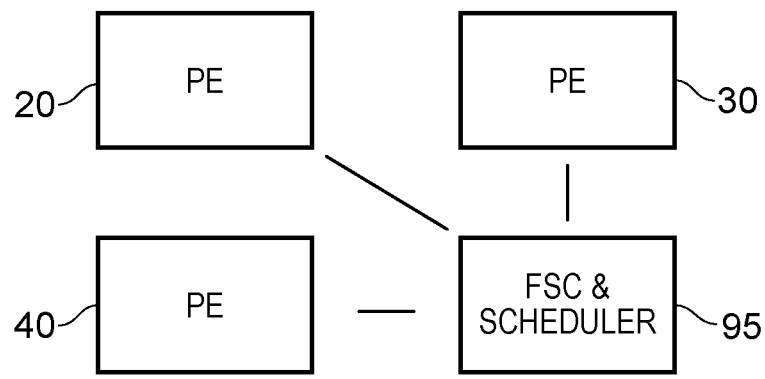

FIGS. 4 to 6 schematically illustrate example implementations of scheduling and format selection circuitry.

In each of FIGS. 4 to 6 the three example processing elements 20, 30, 40 are shown. Other parts of the circuitry of FIG. 1 are not shown, as this description relates just to the interactions between the processing elements.

The scheduling of tasks for execution by the processing elements can be carried out in various ways, for example under the control of an operating system overseeing processing resources of the system. In brief, in FIG. 4 the operation to schedule tasks and to select a context format (to be discussed further below) is distributed between all of the processing elements connected to the current network, as indicated by the broken line portions 24, 34, 44 indicating that a part of the functionality of each processing element is provided to carry out the scheduling and format selection processes. In other words, each processing element takes part in the format selection handshaking process.

In FIG. 5, one processing element, in this example the processing element 20, is dedicated to providing the scheduling and format selection functions.

In FIG. 6, a separate device 95 connected to the interconnect 50 of FIG. 1 is provided to give the format selection and scheduling functions.

In these examples, note that the format selection function (which will be discussed further below) does not have to be carried out by the same device or devices which carry out the scheduling function. One of the arrangements of FIGS. 4-6 could be used for task scheduling and another arrangement for format selection. Or (in the example of FIG. 5) one processing element could provide the functionality of scheduling circuitry and another could provide the functionality of format selection circuitry.

Figure 7:
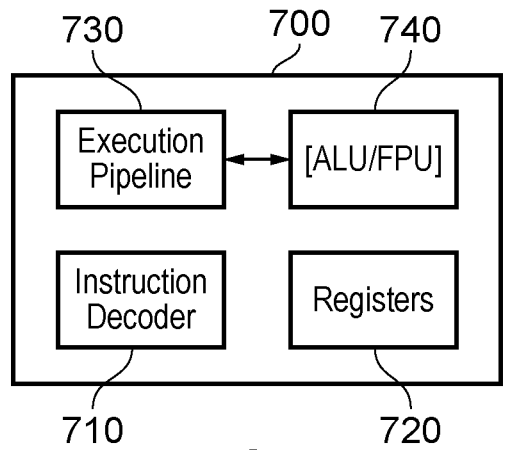
FIG. 7 schematically illustrates a processing element.

FIG. 7 schematically illustrates a processing element 700, for example for use as one of the processing elements 20, 30, 40. Only some features of the processing element are shown here which are relevant to the present description. The skilled person will understand that a processing element may comprise other features which are not shown in FIG. 7.

The processing element comprises an instruction decoder 710, one or more registers 720, an execution pipeline 730 and a specialised computational unit such as an arithmetic logic unit or a floating point unit 740. Between different instances of processing elements, the nature and extent of the registers 720 may vary. The specialised computational unit 740 may or may not be present, or may be present in an emulated form. The instruction decoder may be responsive to a different instruction set to that of another processing element and so on.

Example embodiments consider a situation which can arise, for example, if the processing elements 20, 30, 40 and any other processing elements connected to the interconnect 50 have different processing capabilities for architecture. In such situations, the types of data expected to form part of the context data by one processing element may be irrelevant to (or incapable of being used or understood by) another processing element, or a processing element may be incapable of providing context data which would otherwise be required by one of the other processing elements. This potential mismatch in the nature of the context data is handled in these example embodiments as discussed below.

Upon initiation of the system (for example, power-on or reset, or at the addition of a device to or the subtraction of a device from the coherent domain), the processing elements communicate their own context requirements with the other processing elements and, through a handshaking process, a common set of context data is agreed. This common set of context data is then used in context switches by each of the processing elements.

In examples, therefore, the format selection circuitry is configured to communicate the format definition data and to determine the common set of data items for inclusion in the context data in response to a condition selected from the list consisting of: power-on of the apparatus; reset of the apparatus; addition of a device to the apparatus; and removal of a device from the apparatus.

Figure 8:
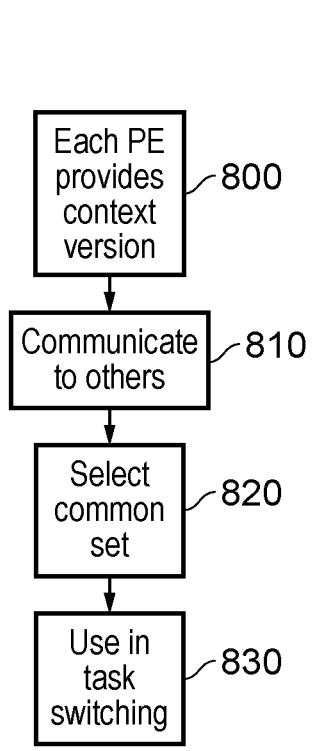
FIGS. 8 and 9 are schematic flowcharts illustrating the selection of a set of data items for inclusion in context data.

FIG. 8 is a schematic flowchart illustrating this selection process. At a step 800, each processing element provides a context "version" to the other processing elements and this is communicated to the others at a step 810. The context version may be an explicit list of context data items which are useable by that processing element or may be a reference to such a list, for example, a context data version number or the like which unambiguously (at least among those devices in the interconnected arrangement) defines the nature of the context data required by that processing element.

At a step 820, a common set of context data is derived, for example by the format selection circuitry discussed above (which may be distributed or provided otherwise as shown in FIGS. 4 to 6) and communicated to each processing element. In an example in which the functionality of the format selection circuitry is distributed amongst the processing elements, this involves each processing element communicating its context version to each other processing element.

At a step 830, the common set of context data is used in task switching by each of the processing elements. This then allows a task to be switched from any processing element to any other processing element in the set because the common context data is used at each task switch.

Therefore, in examples, each processing element has respective associated format definition data (such as the list or reference to a list discussed above) to define one or more sets of data items for inclusion in the context data, and this is communicated to other processing elements (for example by the format selection circuitry) at the step 810. The format selection circuitry handles the communication of the format definition data of each of the processing elements to others of the processing elements and determines, in response to the format definition data for each of the processing elements, a common set (at the step 820) of data items for inclusion in the context data.

Operating according to the common set of context data may mean suppressing some advanced or specific functionality of more powerful processing elements in the set of processing elements connected to the interconnect 50. For example, if one processing element has a specialised computational unit such as a coprocessor, floating point unit or arithmetic logic unit but the other processing elements do not, then it may be appropriate for the processing element having that additional capability to suppress its use in order to be able to provide context data compatible with the other processing elements.

It should also be understood that a processing element may be excluded from the set which operates according to the common set of context data, in which case the set of processing elements operating in this way is defined as those which use the common context data.

The set of data items for each processing element (defined by the format definition data applicable to that processing element) can be indicative of a set of processing capabilities of that processing element. For example, these may include one or more of: a capability to access one or more processor registers; a capability to operate according to one or more control states; and a capability to provide the function of a specialised computational unit (either by its physical presence or by its emulation). The format selection circuitry is configured to select, as a common set of data items, data items indicated by the format definition data for each processing element as being common to all of the processing elements. In some instances, however, only some of the data items which are indicated as being common to all of the processing elements are selected as the common set of data items for use in the context data during context switching. In this way, a subset of those data items indicated by the format definition data as being common to all of the processing elements can be selected. This selection could be carried out on the basis of or in response to data defining one or more criteria, for example one or more criteria selected from the list consisting of: a criterion defining a maximum latency at program task suspension or resumption; and/or a criterion defining a set of data items required by program tasks to be executed.

Considering the first of these example criteria, the latency at program task suspension or resumption (generally indicated, in the case of a single processing element, by the time periods 210, 230 in FIG. 2) can depend upon the amount of context data to be saved and to be loaded. If the amount of context data is reduced, the saving and loading may potentially be quicker. Therefore, one of the criteria used by the format selection circuitry could be a maximum latency allowable in the particular rotation in use, with a common set of context data being selected, for example according to a mapping between number or extent of the context data items and context switching latency maintained by the format selection circuitry, so that it can be saved and loaded without exceeding the maximum allowable latency period.

Considering the other example criteria, it may be that the particular program tasks to be executed do not require certain processing features such as these of a specialised computational unit (for example, a floating point unit). This criterion may be, for example, settable by the program code or by an operating system setting. If this is the case, then even though context data relating to those features may be common to the processing element in use, it can be excluded from the common set of context data by the format selection circuitry because it is not required in respect of execution of the particular program tasks to be performed.

Figure 9:
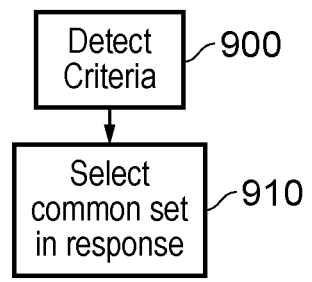

FIG. 9 schematically illustrates this process, in which, at a step 900, the format selection circuitry detects one or more criteria as discussed above and, at a step 910, the format selection circuitry selects a common set of context data in response to those criteria. The detection of the criteria at the step 900 can involve consulting stored data (for example, in a reserved area of the main memory) defining the criteria, for example being use-settable data, operating system settable data, program settable data and so on.

Figure 10:
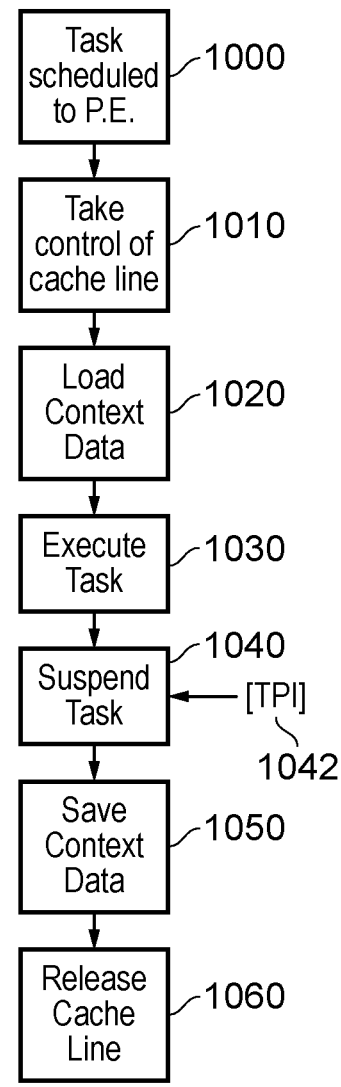
FIG. 10 is a schematic flowchart illustrating task execution.

FIG. 10 is a schematic flowchart illustrating task execution, providing more detail than the flowchart of FIG. 3 discussed above.

In FIG. 10, the process by which context data is stored and retrieved is discussed in more detail. In particular, the context data is stored in the coherent memory structure discussed above. A processing element handling a task takes control of a memory area such as a so-called cache line during execution of the task; it reads context data from that cache line and, following execution of the task, writes context data back to that cache line. So, the control of the cache line is used in part to administer the scheduling and control of a particular instance of execution of a task. The memory area or cache line corresponding to a program task is used or configured to store context data relating to that program task. Each processing element may be configured, in response to suspension of a program task by that processing element, to save context data relating to that program task to the respective memory region of the coherent memory circuitry and/or to release exclusive write access of the relevant memory region.

Referring to FIG. 10, a task is scheduled to a processing element by the scheduling circuitry at a step 1000 (for example, under the control of the operating system). At a step 1010, the processing element takes control of the cache line or other memory area associated with the context data for that task. This may involve for example the processing element temporarily taking ownership (for example exclusive write access) of that cache line (or more generally the memory region corresponding to a program task) in the coherent domain, at least while that processing element is executing that program task.

Note that in some examples a context could be used by another processing element in parallel with the processing element that has taken ownership of that memory region.

At a step 1020, the processing element loads context data from that cache line or other memory area and, at a step 1030 executes the task. As before, it is noted that the loading of context data and the execution of the task can overlap in time such that the processing element may be configured to detect, after loading (at least some) context data and resuming execution of a program task, whether that processing element requires further data items generated by another of the processing elements which previously executed that program task and, when such further data items are required, to load those further data items. The further data items may be stored in the same cache line or memory area or may be accessible through other memory areas. However, the context data which has to be loaded at the step 1020 in order to commence execution of the task at the step 1030 is provided in the controlled cache line.

At a step 1040, the processing element suspends execution of the task. This may be in response to a break point in the program code, to a time period indicator 1042 discussed below, to an interrupt received by the processing element and so on. At a step 1050, the processing element saves the context data to the cache line discussed above and, at a step 1060, releases control of that cache line. In other words, each processing element is configured, in response to suspension of execution of a program task by that processing element, to release exclusive write access of that memory region (corresponding to that program task).

Each processing element in these examples is therefore configured, at resumption of execution of a program task (the step 1000), to take exclusive write access (at the step 1010) to a memory region of the coherent memory circuitry in which context data relating to that program task, previously saved by that processing element or another of the processing elements, is stored and to load the stored context data from that memory region.

In summary, therefore, the apparatus of FIG. 1 can start operation (following reset, power on, or addition or subtraction of a device for example) by performing a context format handshake at compute element power on and reset. This consists of a mechanism to pass the context version across a coherency network (consisting of a bus, network, memory, RDMA, or equivalent device).

Example handshake processes involve each compute element (even across multiple systems-on-chip (SoCs)) making available the highest context version it supports globally visible, which is to say, available to other processing elements in the interconnected arrangement. Then, for example in a second round or interaction, each compute element broadcasts the version it will use, which may be the lowest value (defining some or all of the common items of context data) provided from all compute elements. Upon consensus, all compute elements can proceed and will save (and load) their contexts in this format at context switch operations so that processing can be transparently migrated between the processing elements.

In examples, coherency mechanisms can be used to transfer architectural state between the processing elements. The operating system/software layer is not necessarily required to transfer the architectural state, thus enabling inter-compute element context migration to happen quickly. Specifically, the hardware handles the migration autonomously, thus requiring no software-issued instructions. In current systems we would use the coherency protocol to transfer the state.

For example, an ARMv8-A AArch64 context consists of user registers, TLS (thread local storage) registers TPIDR_ELO and TPIDDRO_ELO, page table base registers TTBRO and TIBR1, and subsets of control registers CNTKCTLEL1, CNTP_CTLELO, CPACR_EL1, SCTLR, SCR, HCR, TCR, MDCR_EL2, MDCR_EL3, and PMUSERENR_ELO. A minimum set of context data (agreed by the processing elements at the step 820/910) can specify fewer than this full list of registers, after which remaining context can be loaded from coherent memory on demand as discussed above.

In examples, once the state is transferred via cache line ownership transfer, the state is loaded from the cache line. Each architected register within the compute element is loaded from the specified context cache line format. Once that happens the state transfer is complete.

Example embodiments can enable heterogeneous compute element process/thread migration in the middle of a compute kernel execution.

Figure 11:
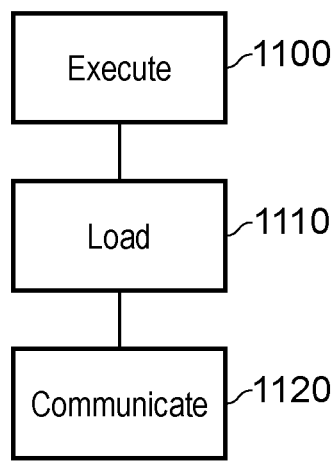
FIGS. 11 and 12 are schematic flowcharts illustrating methods.

FIG. 11 is a schematic flowchart illustrating a method comprising:

(at a step 1100) each processing element, in a group of one or more interconnected processing elements configured to execute processing instructions of program tasks, saving context data relating to a program task following execution of that program task by that processing element, each processing element having respective associated format definition data to define one or more sets of data items for inclusion in the context data;

(at a step 1110) each processing element loading context data, previously saved by that processing element or another of the processing elements, at resumption of execution of a program task; and communicating (at a step 1120) the format definition data of each of the processing elements with others of the processing elements and to determine, in response to the format definition data for each of the processing elements, a common set of data items for inclusion in the context data.

Figure 12:
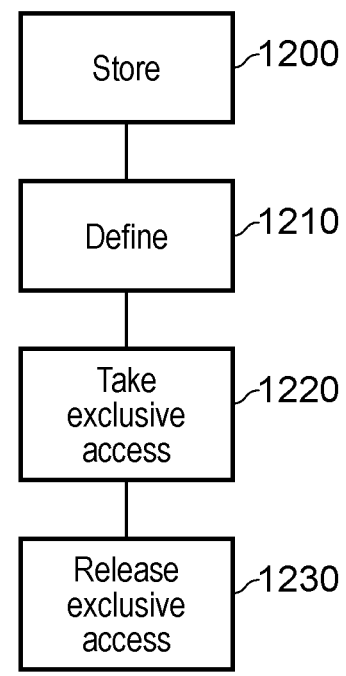

FIG. 12 is a schematic flowchart illustrating a method comprising:

coherently storing (at a step 1200) one or more copies of data accessible by each of one or more interconnected processing elements, so that data written to a memory address by one processing element is consistent with data read from that memory address by another of the processing elements;

defining (at a step 1210) one or more memory regions of the coherently stored data, each memory region storing data defining a respective program task;

(at a step 1220) each processing element taking exclusive write access to a memory region of the one or more memory regions corresponding to a given program task while that processing element is executing that program task; and (at a step 1230) that processing element releasing exclusive write access to that memory region following execution of the given task by that processing element.

The apparatus of FIG. 1, operating in accordance with the method of FIG. 11, provides an example of a data processing apparatus comprising:

one or more interconnected processing elements;

each processing element being configured to execute processing instructions of program tasks;

each processing element being configured to save context data relating to a program task following execution of that program task by that processing element; and to load context data, previously saved by that processing element or another of the processing elements, at resumption of execution of a program task;

each processing element having respective associated format definition data to define one or more sets of data items for inclusion in the context data;

the apparatus comprising format selection circuitry to communicate the format definition data of each of the processing elements with others of the processing elements and to determine, in response to the format definition data for each of the processing elements, a common set of data items for inclusion in the context data.

The apparatus of FIG. 1, operating in accordance with the method of FIG. 12, provides an example of a data processing apparatus comprising:

one or more interconnected processing elements each configured to execute processing instructions of a program task; and coherent memory circuitry storing one or more copies of data accessible by each of the processing elements, so that data written to a memory address in the coherent memory circuitry by one processing element is consistent with data read from that memory address in the coherent memory circuitry by another of the processing elements;

in which:

the coherent memory circuitry is arranged as one or more memory regions each storing data defining a respective program task;

each processing element is configured to take exclusive write access to a memory region of the coherent memory circuitry corresponding to a given program task while that processing element is executing that program task and to release exclusive write access to that memory region following execution of the given task by that processing element.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

We claim:

1. Data processing apparatus comprising:
one or more interconnected processing elements;
each processing element comprising processing circuitry and being configured to execute processing instructions of program tasks;
said each processing element being configured to save context data relating to a program task following execution of that program task by that processing element; and to load context data, previously saved by that processing element or another of the processing elements, at resumption of execution of a program task;
said each processing element having respective associated format definition data to define one or more sets of data items for inclusion in the context data, the format definition data for a given processing element defining at least one context data requirement for that given processing element;
the apparatus comprising format selection circuitry to communicate the format definition data of each of the processing elements with others of the processing elements and to determine, in response to the format definition data for each of the processing elements, a common set of data items for inclusion in the context data.

2. Apparatus according to claim 1, in which the set of data items for each processing element is indicative of a set of processing capabilities of that processing element.

3. Apparatus according to claim 2, in which the set of data items for each processing element is indicative of one or more processing capabilities selected from the list consisting of:
a capability to access one or more processor registers;
a capability to operate according to one or more control states; and
a capability to provide the function of a specialized computational unit.

4. Apparatus according to claim 1, in which the format selection circuitry is configured to select, as a common set of data items, data items indicated by the format definition data as being common to all of the processing elements.

5. Apparatus according to claim 4, in which the format selection circuitry is configured to select, as a common set of data items, all of the data items indicated by the format definition data as being common to all of the processing elements.

6. Apparatus according to claim 4, in which the format selection circuitry is configured to select, as a common set of data items, a subset of those data items indicated by the format definition data as being common to all of the processing elements.

7. Apparatus according to claim 6, in which the format selection circuitry is configured to select the common set of data items in response to data defining one or more criteria selected from the list consisting of:
a criterion defining a maximum latency at program task suspension or resumption; and
a criterion defining a set of items required by program tasks to be executed.

8. Apparatus according to claim 1, in which one or more of the processing elements is configured to detect, after loading context data and resuming execution of a program task, whether that processing element requires further data items generated by another of the processing elements which previously executed that program task and, when such further data items are required, to load those further data items.

9. Apparatus according to claim 1, comprising:
coherent memory circuitry storing one or more copies of data accessible by each of the processing elements, so that data written to a memory address in the coherent memory circuitry by one processing element is consistent with data read from that memory address in the coherent memory circuitry by another of the processing elements.

10. Apparatus according to claim 9, in which each processing element is configured to take exclusive write access to a memory region corresponding to a program task while that processing element is executing that program task.

11. Apparatus according to claim 10, in which each processing element is configured, in response to suspension of a program task by that processing element, to release exclusive write access of that memory region.

12. Apparatus according to claim 11, in which each processing element is configured, at resumption of execution of a program task, to take exclusive write access to a memory region of the coherent memory circuitry in which context data relating to that program task, previously saved by that processing element or another of the processing elements, is stored and to load the stored context data from that memory region.

13. Apparatus according to claim 9, in which the coherent memory circuitry comprises two or more coherent cache memories and the coherent memory circuitry is configured to store multiple copies of the data accessible by each of the processing elements.

14. Apparatus according to claim 1, in which the format selection circuitry is configured to communicate the format definition data and to determine the common set of data items for inclusion in the context data in response to a condition selected from the list consisting of:
    power-on of the apparatus;
    reset of the apparatus;
    addition of a device to the apparatus; and
    removal of a device from the apparatus.

15. A method comprising:
    each processing element, in a group of one or more interconnected processing elements configured to execute processing instructions of program tasks, saving context data relating to a program task following execution of that program task by that processing element, each processing element having respective associated format definition data to define one or more sets of data items for inclusion in the context data, the format definition data for a given processing element defining at least one context data requirement for that given processing element;

each processing element loading context data, previously saved by that processing element or another of the processing elements, at resumption of execution of a program task; and communicating the format definition data of each of the processing elements with others of the processing elements and to determine, in response to the format definition data for each of the processing elements, a common set of data items for inclusion in the context data.

* * * * *